Patented Oct. 24, 1950

2,526,878

UNITED STATES PATENT OFFICE 2,526,878

PROCESS FOR SHIPPING CAUSTIC SODA LIQUORS

Otto Kay, Syracuse, N. Y., assignor to The Allied Chemical & Dye Corporation, a corporation of New York No Drawing. Application June 14, 1945, Serial No. 599,527

5 Claims. (Cl. 204—147)

This invention relates to the shipment of concentrated caustic soda solutions and particularly to preventing contamination of such solutions.

For may years it has been the practice to ship 47% to 50% caustic soda solutions in iron tank cars. In these cars the caustic liquor became contaminated with iron. To prevent this, the practice arose of painting the interior surfaces of the tank cars with a paint which would prevent contamination of the liquor. It has also been proposed to ship more concentrated caustic soda solutions, solutions containing above 50% NaOH, and also to protect the liquor against contamination by painting the walls of the tank with a material which would resist the more corrosive conditions presented by the more concentrated solutions.

Although a large measure of protection is obtained by painting the walls of the tank cars, this method requires frequent repainting and gradual failure of the protective coating of paint often results in undesirable contamination of the caustic liquor. This difficulty is particularly acute when insulated tank cars are used into which the hot caustic liquor is pumped and in which the liquor is at high temperatures during shipment and unloading to prevent solidification. It is common practice to ship what is known in the trade as "70% liquid caustic soda," i. e., solutions which generally contain from about 70% to about 76% NaOH but may contain less than 70% NaOH, in heat insulated tank cars, into which the liquor is loaded hot so it will not freeze to a solid mass in the car during shipment and at the time of unloading to heat the liquor in a tank car up to 100° to 110° C. by means of a coil heater in the tank. This heating of the liquor to high temperatures increases the difficulties of maintaing a satisfactory protective coating of paint on the walls of the tank car.

It is an object of this invention to provide a method for shipping concentrated caustic soda solutions in tank cars while preventing contamination of the solution by an impurity picked up from the walls of the tank car. Other objects of the invention will be obvious or will appear hereinafter.

Nickel, as compared with iron, is resistant to attack by concentrated caustic soda solutions even at elevated temperatures. So far as destruction of nickel by corrosion is concerned, it is a suitable material for lining the surfaces of a tank car exposed to contact with concentrated caustic soda solution during shipment. Its resistance to corrosion by the solution is sufficiently great that a nickel-lined tank car may be in service for long periods without the lining being destroyed by corrosion. Nevertheless, nickel is slowly corroded by caustic soda solutions and in shipping such solutions in nickel-lined tank cars there is an increase in the impurity content of the solution due to nickel dissolved from the lining. This contamination of the solution by nickel represents a real disadvantage in using nickel-lined tank cars because of the extremely high purity of caustic soda solutions demanded by the trade for many purposes, such as rayon manufacture.

It is known to prevent corrosion of metallic vessels by solutions of electrolytes by placing an anode in the solution and passing direct current from an external source through the solution, the walls of the vessel serving as cathode in the electric circuit. This same method has also been utilized for purifying caustic soda solutions of impurities such as iron. For this latter purpose it is known to line the walls of a container for the caustic solution with a nickel screen and by means of a nickel anode immersed in the solution pass an electric current through the solution, the screen serving as the cathode of the electric circuit. Cathode current densities of 7.2 to 21.6 amperes per square foot were said to be preferably employed.

The use of similar conditions to prevent contamination of caustic soda solutions during shipment in the tank cars would be impracticable. With a cathode current density of 7.2 amperes per square foot, in a tank car having a surface of 800 square feet exposed to contact with the solution, about 5760 amperes of current will pass between the electrodes. At 2 volts this is equal to 11,520 watts. If this current were to be supplied to the tank car while on the road for five days, 1,380,000 watt hours would be consumed. The capacity of a first class storage battery is about 15 watt hours per pound of battery. In order to furnish 1,380,000 watt hours of current to the tank car from storage batteries, provision would have to be made for the car to carry 92,000 pounds of batteries; i. e., 46 tons. This is practically as much weight as that of the caustic soda solution the car can carry and is more than the tank car itself weighs. It is clearly impracticable either to place such weight of batteries on the tank car or to design the car with adequate space for carrying the batteries.

Furthermore, it is known that passage of an electric current through a caustic soda solution electrolyzes the solution and liberates hydrogen at the cathode. Hydrogen thus evolved from a solution in a tank car collects above the surface of the liquid and mixes with air which is in the dome of the tank car when initially loaded with the caustic soda solution to form a highly inflammable or explosive gas. This would require that special precautions be taken to avoid the dangers due to an explosion or fire which might result from ignition of the hydrogen by a flame, spark, lighted cigarette, etc.

I have now discovered that within a certain range of extremely low cathode current densities maintained on nickel surfaces of a tank car containing caustic soda solutions, substantially no hydrogen is evolved yet the liquor is protected against contamination with nickel picked up from the tank car surface. I have discovered that at an average cathode current density of 0.001 amp./sq. ft. there is no, or substantially no, evolution of hydrogen from the solution. Even during long periods of time hydrogen does not collect above the liquor level in the tank car to present any hazard due to the formation of explosive mixtures with the air in the dome of the car. With average cathode current densities below 0.0003 amp./sq. ft., there is objectionable contamination of the caustic soda solution with nickel picked up from the surfaces of the tank car during periods of several days time in which the tank car is normally in transit loaded with the liquor. Accordingly, I have found that average cathode current densities of 0.0003 to 0.001 amp./sq. ft. are effective to prevent substantial contamination of the caustic soda solution by pick-up of nickel from the surfaces of the tank car while at the same time no hazard is presented by the evolution of hydrogen from the solution in the tank car.

My invention comprises, therefore, the process for shipping caustic soda liquors of concentration above 50% NaOH, particularly hot, highly concentrated liquors containing more than 60% NaOH and at temperatures of about 50° C. and higher, in tank cars in which the surfaces exposed to contact with the hot solution are of nickel. The invention is especially useful in conjunction with the present practice of shipping hot caustic soda liquors containing about 70% to 76% NaOH. These solutions freeze to a solid mass at temperatures below about 62° C. They are, therefore, maintained at temperatures of about 62° and higher during shipment. The nickel surfaces of the tank car in contact with the caustic soda solution are made the cathode in an electric circuit comprising an anode immersed in the solution in the tank car, with an average cathode current density of 0.0003 to 0.001 ampere per square foot maintained over the nickel surfaces in contact with the caustic soda solutions. As used in this specification and appended claims the term "average cathode current density" or or over nickel surfaces means the rate of flow of current between the electrodes divided by the area of the cathode surface.

The anode immersed in the solution need not be large, nor its surface elaboratedly developed so that all points of the cathode surface are substantially equally distant from the anode surface, as is commonly done in arranging electrodes in a liquid through which an electric current is to be passed. Adequate distribution of the current passed between the electrodes to prevent contamination of the caustic soda solution may be obtained by an anode of small size immersed in the solution, preferably centrally of the tank car. The immersed surface area of the anode may be small as compared with the area of the tank car exposed to contact with the solution and the anode may be of a form such that there is non-uniformity in the distances between parts of the tank car surfaces and the surface of the anode. Thus, it has been found the distance from the more remote surfaces of the tank car to the anode may be 5 to 10 or even more times as great as the distance between the anode and the tank car surface closest thereto.

The ability to employ this type of anode in large tank cars in practicing my invention is related to the very low current densities which I have found effective to prevent contamination of the liquor with nickel. An electric current passing between electrodes immersed in a conducting solution tends to follow the path of least resistance, which is along the shortest path through the solution from one electrode to the other. If a high current density on a nickel surface in a tank car were required to prevent nickel pick-up from that surface, the greater resistance to the passage of current to the more remote parts of the car would tend to prevent the current density thereon being adequate to prevent nickel pick-up therefrom and resulting contamination of the caustic soda solution unless excessively high voltages were impressed on the electrodes with a resulting excessively large flow of current. It is because very low current densities are effective in my process to prevent nickel pick-up by the caustic soda solution, that the required current densities may be maintained on portions of the tank car remote from the anode without having to use complicated forms of anode to obtain uniform cathode current densities.

The anode is constituted of any material suitably resistant to attack by the caustic soda solution. For example, it may be of nickel with an oxidized surface or of carbon. When initially installed the nickel anode may have on it an oxidized surface. However, when nickel in contact with caustic soda solution is made the anode of an electric circuit, the metallic nickel becomes coated with an oxide film. Accordingly, my apparatus initially may be constructed with an anode of nickel, which assumes the oxide coating when the apparatus is put in service.

The current required is preferably supplied by a secondary battery such as the well known lead plate-sulfuric acid storage cell. The use of a secondary battery will insure the maintenance of a substantially constant E. M. F. between the electrodes constituted of the nickel surfaces of the tank car and the immersed electrode in contact with the caustic soda solution in the tank car, irrespective of whether the car is in motion or at rest. Under these conditions contamination of the caustic soda liquor by pick-up of nickel from the tank car surfaces is substantially prevented during long periods of shipment, even though the liquor be maintained at elevated temperatures to prevent solidification thereof.

The invention will be more specifically illustrated by the following example, although it is not limited thereto:

A tank car having a nickel lining on its inside surfaces, was provided with an anode consisting of a short length of nickel pipe, closed at its lower end and supported from the stand pipe in the tank car but electrically insulated therefrom. The lower portion of this anode was submerged in the caustic soda solution in the tank car. An insulated wire was connected to the top of the anode tube and passed upwardly out of the dome at the top of the tank car. Both the anode and the wire leading thereto were carefully insulated from the tank car. Storage batteries served as the source of current; their positive terminal being connected to the wire leading to the anode and their negative terminal to a point on the under frame of the car so that the nickel lining of the tank became the cathode of the electric circuit established when caustic soda solution was introduced into the tank car. A small resistance was connected into one of the leads from the batteries to the electrodes to permit of controlling the current flow.

This tank car was filled with hot caustic soda solution containing 70% to 72% NaOH. By means of the batteries a flow of current was maintained between the two electrodes of 0.35 to 0.50 ampere. The nickel surface of the tank car submerged in the caustic soda liquor was about 800 sq. ft. Accordingly, the average cathode current density was about 0.0004 to about 0.0006 amp./sq. ft. The following table shows the results of periodic analyses for the nickel content of the solution in the tank car:

|  | Parts per million |
|---|---|
| Liquor as loaded | 0.2 |
| Second day | 0.5 |
| Tenth day | 0.6 |

The car was closed on the second day. On the seventh and ninth days samples were taken of the gas above the liquor in the tank car. These samples were analyzed for hydrogen. No hydrogen was found.

The following table shows the results of periodic analyses for the nickel content of another hot, 70–72% caustic soda solution held in a nickel-lined tank car provided with the same type of anode as described above and with a total current of 0.3–0.5 amp. flowing between the tank car as cathode and the anode immersed in the solution. The average current density in this case was also about 0.0004 to about 0.0006 amp./sq. ft.

|  | Parts per million |
|---|---|
| Liquor as loaded | 0.5 |
| Second day | 0.6 |
| Ninth day | 0.7 |
| Tenth day | 0.6 |

The car was closed on the second day. On the ninth day a sample of the gas was taken from above the liquor in the car. No hydrogen was found on analysis of this sample.

For comparison with the above, with no electrical potential applied to the nickel lining of a tank car in contact with 70–72% caustic soda liquor, a starting liquor containing 2.6 parts per million of nickel after 4 days contained 4.2 parts per million of nickel and after 6 days contained 4.9 parts per million. Thus there was substantial contamination of the liquor with nickel picked up from the tank car surface (an increase of 2.3 parts per million in the nickel content of the liquor). In another test with a total current flowing between the electrodes of 0.92 to 1.15 amps., corresponding to an average cathode current density of about 0.0012 to about 0.0014, although the electric current prevented contamination of the liquor with nickel, gas samples taken from above the liquor level in the car on the sixth day after loading analyzed 4.1% hydrogen. Thus, there was substantial evolution of hydrogen and the gas space in the tank car became filled with a mixture of hydrogen and air.

An important aspect of the invention results from my discovery that extremely low, average current densities on the nickel cathode surfaces are effective to protect the caustic soda liquor against substantial pick-up of nickel from the tank car surfaces. As shown above, a current of 0.5 amp. flowing through a tank car is adequate to protect the liquor against substantial pick-up of nickel from about 800 sq. ft. of metal surface in contact with the liquor. A current of 0.5 amp. maintained on the tank car during shipment may be supplied by storage batteries delivering the current at 1.5 volts (Edison alkaline batteries) or 2 volts (lead storage cells), with a suitable resistance in the circuit as needed to reduce the total current flow to 0.5 amp. With a total current flowing of 0.5 amp. or less, as in the two examples described above, during a transit period of 5 days not over 60 amp. hours are required to protect the liquor against contamination with nickel. This amount of current is well within the capacity of a first-class lead plate storage battery of the type commonly supplied for use in automobiles. This may be compared with the 92,000 pounds (46 tons) of battery which would be required to supply the energy used heretofore to maintain a cathode density of 7.2 amp./sq. ft. in vessels containing caustic soda solutions.

This application is a continuation-in-part of my copending application, Serial No. 466,675, filed June 11, 1942 (now abandoned).

I claim:

1. The process for preventing contamination with nickel of a hot caustic soda solution containing above 60% NaOH at temperatures of about 50° C. and higher during shipment in a tank car in which the surfaces exposed to contact with said hot solution consist of nickel, which comprises immersing in the caustic soda solution an anode of a material resistant to attack by the caustic soda solution which has a small surface area as compared with the area of the surfaces of said tank car exposed to contact with said solution and is of a form such that there is non-uniformity in the distances between parts of the nickel surfaces of the tank car and the surfaces of said anode, and maintaining between said anode and the nickel surfaces of the tank car which are in contact with the caustic soda solution a flow of direct electrical current of a magnitude such that there is an average cathode current density of 0.0003 to 0.001 amp./sq. ft. over the nickel surfaces of the tank car which are in contact with said hot solution.

2. The process for preventing contamination with nickel of a hot caustic soda solution containing above 60% NaOH at temperatures of about 50° C. and higher during shipment in a tank car in which the surfaces exposed to contact with said solution consist of nickel which comprises immersing in the caustic soda solution an anode of a material resistant to attack by the caustic soda solution which has a small surface area as compared with the area of the surfaces of said tank car exposed to contact with said solution and is of a form such that the distance from the more remote surfaces of the tank car to the anode is 5 or more times as great as the distance between the anode and the tank car surface closest thereto, and maintaining between said anode and the nickel surfaces of the tank car which are in contact with the caustic soda solution a flow of direct electrical current of a magnitude such that there is an average cathode current density of 0.0003 to 0.001 amp./sq. ft. over the nickel surfaces of the tank car which are in contact with said hot solution.

3. The process for preventing contamination with nickel of a hot caustic soda solution containing above 60% NaOH at temperatures of 50° C. and higher during shipment in tank cars in which the surfaces exposed to contact with said solution consist of nickel and the hot solution becomes contaminated with nickel picked up from said surfaces, which comprises maintaining between an anode of a material resistant to attack by the caustic soda solution and immersed in the caustic soda solution and the nickel surfaces of the tank car in contact therewith a flow of a direct electrical current of a magnitude such that there is an average cathode current density of 0.0003 to 0.001 amp./sq. ft. over the nickel surfaces of the tank car which are in contact with said hot solution.

4. The process for preventing contamination with nickel of a hot caustic soda solution containing about 70% to about 76% NaOH at temperatures of 62° C. and higher during shipment of the solution in tank cars in which the surfaces exposed to contact with said solution consist of nickel and the hot solution becomes contaminated with nickel picked up from said surfaces which comprises maintaining between an anode of a material resistant to attack by the caustic soda solution and immersed in the caustic soda solution and the nickel surfaces of the tank car in contact therewith a flow of a direct electrical current of a magnitude such that there is an average cathode current density of 0.0003 to 0.001 amp./sq. ft. over the nickel surfaces of the tank car which are in contact with said hot solution.

5. In the shipping of a hot caustic soda solution containing about 70% to about 76% NaOH in a metal tank car in which the metal surfaces are contacted with said hot caustic solution and the solution is heated to temperatures of about 100° C. to about 110° C., the improvement which comprises using a tank car in which the surfaces exposed to contact with said hot solution are of nickel and maintaining between an anode of a material resistant to attack by the caustic soda solution and immersed therein and the nickel surfaces of the tank car in contact therewith a flow of a direct electrical current of a magnitude such that there is an average cathode current density of 0.0003 to 0.001 amp./sq. ft. over the nickel surfaces of the tank car which are in contact with said solution, thereby inhibiting contamination of said solution with nickel.

OTTO KAY.

REFERENCES CITED

The following references are of record in the file of this patent:

UNITED STATES PATENTS

| Number | Name | Date |
|---|---|---|
| 1,227,453 | Kipper | May 22, 1917 |

OTHER REFERENCES

"Transactions of The Electrochemical Society," vol. 72 (1937), pages 396 through 399; vol. 73 (1938), pages 539 through 554.

"Petroleum Engineer," Oct. 1940, pages 156, 157; Sept. 1941, pages 51 through 57.

"Corrosion Resistance of Metals and Alloys," by McKay et al. (Reinhold Publication Corporation), published in 1936, page 363.